(12) United States Patent
Schultz

(10) Patent No.: US 6,315,252 B1
(45) Date of Patent: Nov. 13, 2001

(54) REMOVABLY MOUNTED COMPUTER STAND FOR AUTOMOBILES AND THE LIKE

(76) Inventor: Jefrey S. Schultz, 451 Shay Dr., Marietta, GA (US) 30060

( * ) Notice: Subject to any disclaimer, the term of this patent is extended or adjusted under 35 U.S.C. 154(b) by 0 days.

(21) Appl. No.: 09/577,396

(22) Filed: Nov. 2, 2000

Related U.S. Application Data

(63) Continuation of application No. 09/131,841, filed on Aug. 19, 1998, now abandoned
(60) Provisional application No. 60/062,254, filed on Oct. 17, 1997.

(51) Int. Cl.⁷ ................................................. F16M 13/00
(52) U.S. Cl. ..................... 248/160; 248/918; 248/188.5; 108/45; 108/44
(58) Field of Search ................................. 248/160, 918, 248/161, 188.5, 181.1, 910, 176.1, 917; 108/45, 44

(56) References Cited

U.S. PATENT DOCUMENTS

| | | | | |
|---|---|---|---|---|
| 1,156,083 | * | 10/1915 | Karges | 248/161 |
| 1,735,949 | * | 11/1929 | Brady | 248/160 |
| 1,790,500 | * | 1/1931 | Fischer | 248/160 |
| 2,481,271 | * | 9/1949 | Willey | 248/160 |
| 2,784,261 | * | 3/1957 | Anklesaria | 248/160 |
| 4,672,898 | * | 6/1987 | Davidson | 108/6 |
| 4,797,798 | * | 1/1989 | Schumaker et al. | 362/413 |
| 4,842,174 | * | 6/1989 | Sheppard et al. | 224/273 |
| 4,852,499 | * | 8/1989 | Ozols | 108/44 |
| 4,872,469 | * | 10/1989 | Schultz | 135/69 |
| 5,025,353 | * | 6/1991 | Menaged | 362/98 |
| 5,201,488 | * | 4/1993 | Hadbavny | 248/354.5 |
| 5,485,793 | * | 1/1996 | Crowell | 108/44 |
| 5,673,628 | * | 10/1997 | Boos | 108/44 |
| 5,690,307 | * | 11/1997 | Joyce | 248/274.1 |
| 5,769,369 | * | 6/1998 | Meinel | 248/176.1 |
| 5,842,670 | * | 12/1998 | Nigoghosian | 248/160 |

* cited by examiner

*Primary Examiner*—Anita King
*Assistant Examiner*—Kimberly Wood
(74) *Attorney, Agent, or Firm*—Harry I. Leon; Vivian L. Steadman

(57) ABSTRACT

A computer stand for holding a notebook-type computer at a convenient height for use in a motor vehicle. The stand, which is free-standing, holds the computer in sight and reach of the driver and is particularly useful for reading location maps. It also facilitates the use of the computer in modem/facsimile operations while a commuter is in transit. The computer stand comprises a weighted base, a flexible column and a platform for detachably mounting a laptop computer. Weights in the base provide ballast for the computer stand. The column has both a telescopic section and a flexible segment so that the position of the platform can be easily adjusted, bringing any computer mounted thereon in reach and sight of the user without interfering with the seating or control of the vehicle. Generally, the weighted base has sufficient ballast to keep the computer stand stable while the vehicle is in operation; but for added safety, a strap is provided which can be used to secure the base to the undercarriage of the passenger or driver seat.

3 Claims, 3 Drawing Sheets

REMOVABLY MOUNTED COMPUTER STAND FOR AUTOMOBILES AND THE LIKE

This application is a continuation-in-part of application number 09/131,841, filed on Aug. 10, 1998, now abandoned.

BACKGROUND OF THE INVENTION

This application is a continuation-in-part of provisional patent application Ser. No. 60/062,254, filed Oct. 17, 1997.

SUMMARY OF THE INVENTION

The primary object of this invention is to provide a free-standing support for holding a laptop computer, or equivalent, at a convenient height for use in an automobile or the like.

A further object of this invention is to provide such a support which is adjustable and which can be fitted into a wide variety of vehicles.

A still further object of this invention is to provide such a support in which a computer held thereon can be disposed not only at a convenient distance from the computer operator but also sat an optimum angle for keyboard entry and screen viewing.

In accordance with the present invention, a computer stand comprises a weighted base, a flexible column which is attached to and extends upwardly from the base, and a support plate. Secured to the upper end of the column, the support plate includes an upper surface on which the computer rests in use. The column comprises a telescopic section and a semi-rigid flexible section which is bendable through an angle of at most about 45 degrees and which holds its position once it has been so bent. With the improved stand, not only does the support plate tend to stay fixed in place once positioned, even while it is being subjected to the acceleration and deceleration forces commonly experienced in moving automobiles, but also the driver, using only one hand and while his vehicle is in motion, can make small adjustments in the angular orientation of the support plate.

Means for securing the computer to the support plate includes a hook and loop-type fastener, such as segments of VELCRO®, affixed to the support plate and to the computer. In the case of the hook and loop-type fastener, one segment thereof is attached adhesively to the support plate in such a way that a hook (or alternately, loop) face of the segment is directed away from the support plate. A mating segment of the fastener is secured to the bottom side of the computer so that when the computer is placed on top of the support plate, the two segments form a bond, holding the computer securely. Alternately, a double-sided adhesive tape or a mechanical fastener can be used to mount the computer permanently.

Prior to use, the computer stand is simply carried into a vehicle; and the base is set so that it does not interfere with either the driver's or any passenger's seating. In practice, it has been found that even in a compact automobile, a driver can use a computer mounted on the computer stand according to the present invention without interfering with the utilization of the adjacent front seat.

Once a computer has been affixed, with a fastener, to the support plate, its position can be adjusted, by rotating it and by bending the column and either extending or retracting the telescopic section, until the user can read the computer screen.

The computer stand of this invention is particularly useful for commuters who wish to read computer-generated maps as they are driving. Further, in combination with a satellite-based locator system, information can be fed into the computer to guide a driver as he reads a map displayed thereon.

DETAILED DESCRIPTION OF THE PREFERRED EMBODIMENT

Figure 5:
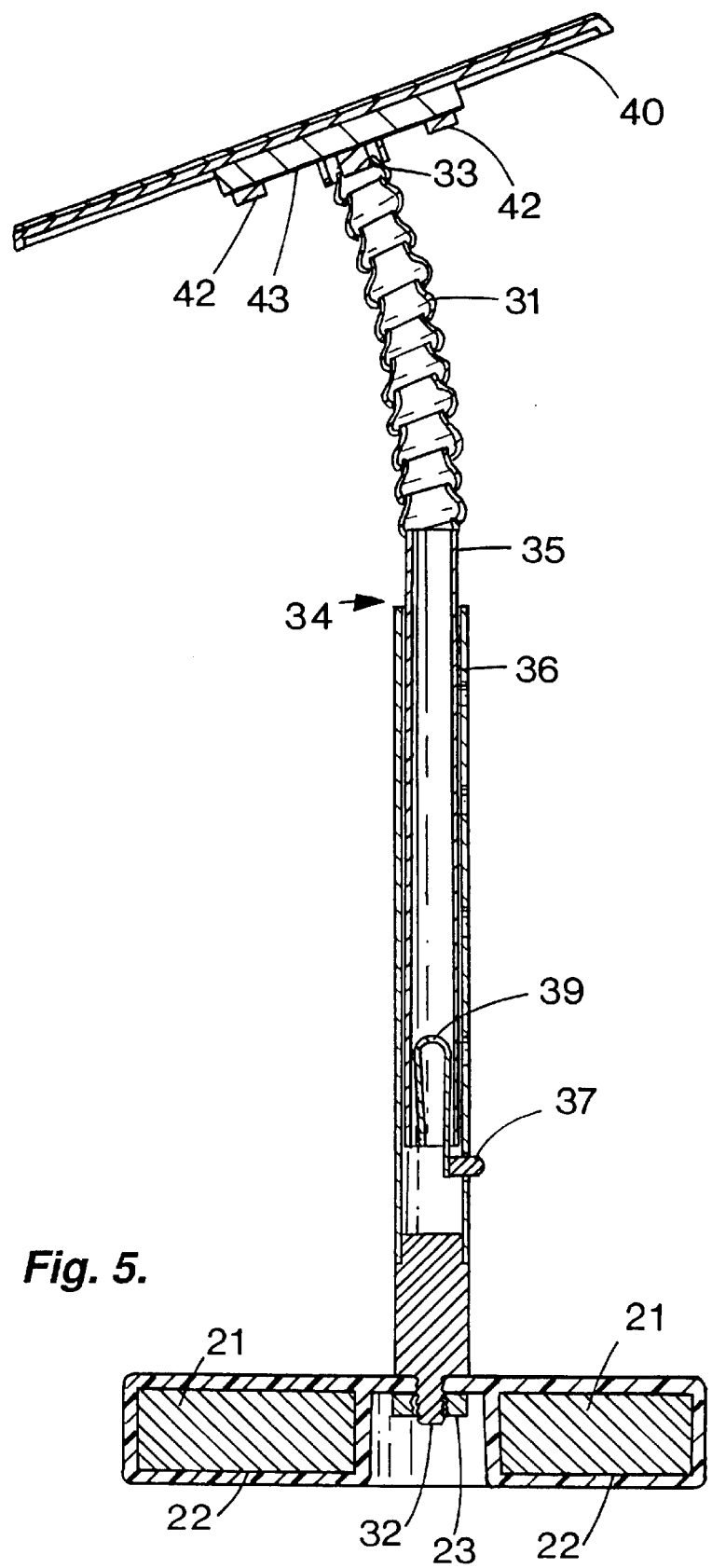
FIG. 5 is a longitudinal cross-section, on an enlarged scale, of the computer stand according to FIG. 1.

Referring now to the drawings, a computer stand according to the present invention is indicated generally by the reference numeral 10. The computer stand 10 comprises a base 20, a support column 30, and a computer platform with a support plate 40. The base 20 defines a centrally disposed socket 23 for threadedly engaging the lower end 32 of the support column 30 (FIG. 5). The base 20 further defines a hollow compartment 22 within which are stored weights 21 (FIG. 5). The weights 21, which are formed of a dense material such as iron, lead, concrete or like, provide ballast for the computer stand 10.

Figure 4:
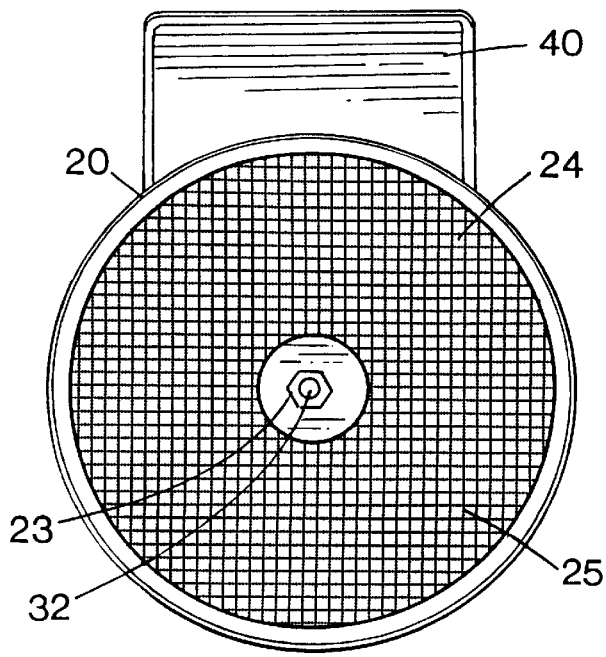
FIG. 4 is a bottom view, on an enlarged scale, of the computer stand according to FIG. 1.

In the preferred embodiment, the stand 10 includes a cast iron base 20 which, by way of example, measures about 10 inches in diameter and 2½ inches high and weighs about 20 lbs. The support column 30 is preferably made from a semi-rigid steel column which measures, again by way of example, about ¾ inch in diameter and 18 inches long. Atop this steel column, a support plate 40 fabricated from a ⅛ inch thick aluminum sheet, measuring about 4 inches by 8 inches, has been found to work well in practice As is illustrated in FIG. 4, the underside 24 of the base 20 includes a non-slip face 25 which is preferably a roughened surface. Alternately, the non-slip face 25 can be a sticky surface or a plurality of short sharp pins. Preferably, the base 20 is also secured by a safety strap 26 to the fixed undercarriage of either the passenger or driver seat (FIG. 1).

Figure 1:
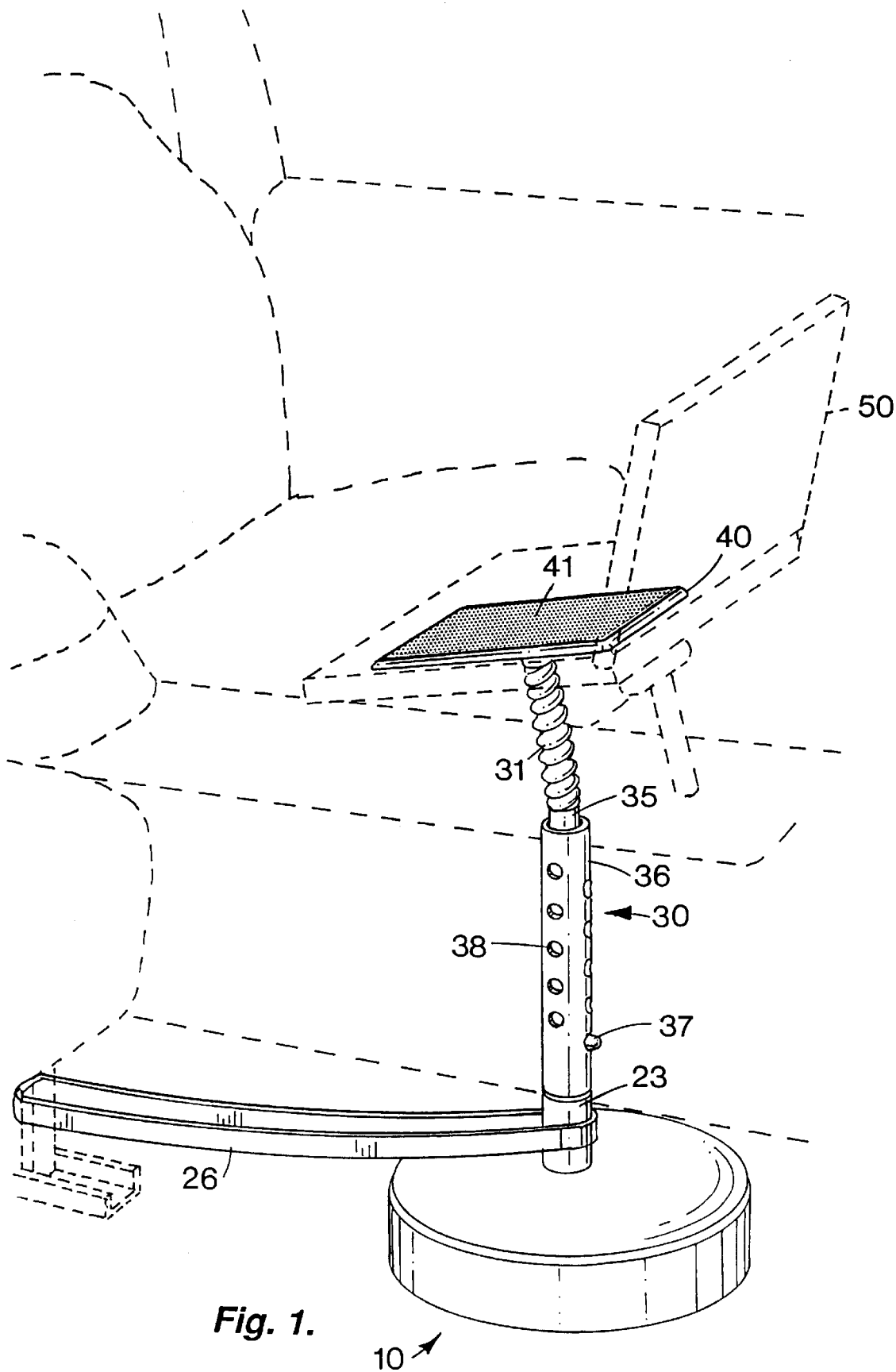
FIG. 1 is a top left side perspective view of the computer stand showing it mounted in a typical automobile, the dashed lines which outline the interior of the automobile and a laptop computer being for illustrative purposes only and forming no part of the claimed invention.
Figure 3:
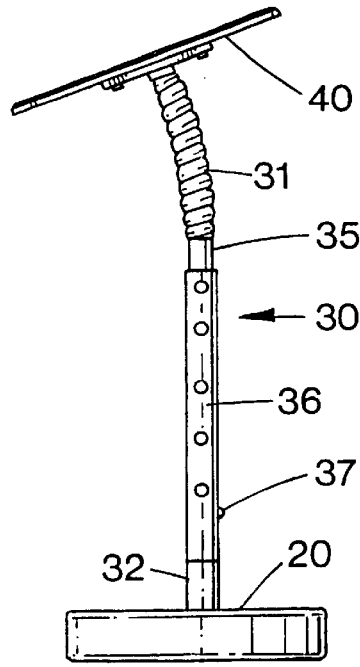
FIG. 3 is a right side elevation view, on a reduced scale, of the computer stand according to FIG. 1.

In the preferred embodiment, the support column 30 includes a flexible tube 31 attached to a rigid tube 35 which is slidleably engageable with a slightly larger rigid tube 36 (FIGS. 1 and 3). In combination, the tubes 35, 36 define a telescopic section 34 (FIG. 5). Means for adjusting the extension of the telescopic section 34 includes a push button pin 37 attached by a horseshoe spring 39 to the lower end of tube 35 and a series of spaced apart holes 38 formed in the tube 36. In assembled relation, the pin 37 protrudes outwardly through one of the holes 38 and thereby holds the lower end of tube 35 a fixed distance above the base 20 (FIGS. 1 and 5). Not only does the retractable pin 37, when it so protrudes, maintain the tubes 35, 36 in a fixed position relative to each other but also this pin protects a driver, as well as any children or other passengers, against inadvertently pulling the inner telescoping tube 35 out too far when the vehicle is in motion.

In the flexible tube 31, which is preferably fabricated by overlapping the curved edges of a ribbon of steel or like metal in a series of "segments", each "segment" can be tilted only so far relative to contiguous "segments" before it slips out of overlap with them; and the flexible tube becomes unstable. Typically, the maximum deviation from a longitudinal alignment of the through axes of contiguous "segments" which can be tolerated before such slippage occurs is about 5 degrees. In the preferred embodiment, the number of "segments" within the flexible tube 31 is such that the overall angle through which this tube can be bent is generally about 45 degrees—substantially less than 90 degrees from the longitudinal centerline of the telescoping section 34 (FIG. 5).

The computer platform itself preferably includes a flange 43 (FIG. 5). Secured by bolts 42 to the support plate 40, the flange 43 is rotatably connected to a coupling 33 affixed to the upper end of the flexible tube 31, thereby providing additional flexibility in positioning the computer platform beyond that afforded by the column 30. The coupling 33 is preferably a universal joint.

Figure 2:
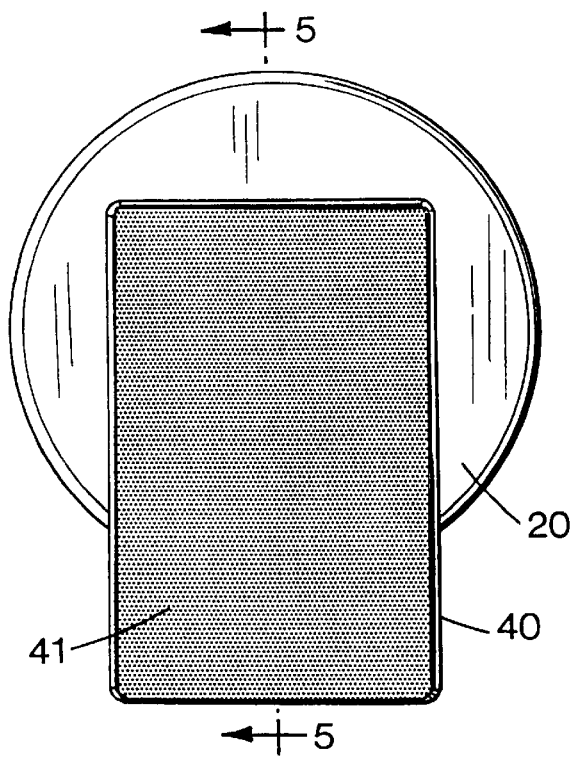
FIG. 2 is a plan view, on an enlarged scale, of the computer stand according to FIG. 1.

In the preferred embodiment, means for securing a computer 50 to the support plate 40 includes a segment 41 of a hook and loop-type fastener of VELCRO R or the like affixed thereto (FIG. 2). For such a fastener, the segment 41 is attached adhesively to the support plate 40 in such a way that a hook (or alternately, loop) face of the segment is directed away from the support plate. A mating segment (not shown) of the fastener is secured to the bottom side of the computer 50 so that when the computer is placed on top of the support plate, the two segments form a bond, securing the computer. Alternately, a consumer can permanently mount the computer 50 on the support plate using a double-sided adhesive or a mechanical fastener (not shown).

With either embodiment, the consumer has the option oil disengaging the telescoping tubes 35, 36 from each other, once her automobile is stopped and she has both hands free. Utilizing the latter feature, she can leave the stand's weighted base 20 in place, undisturbed for later use, and quickly remove the computer still attached to the plate 40, for storage or mounting elsewhere.

It is claimed:

1. A computer stand for holding a laptop computer, comprising:

(a) a weighted base;

(b) a platform for holding the laptop computer, the platform being disposed in a generally horizontal position;

(c) a column having distal ends which are connected to the base and to the platform, respectively, the column having a flexible tube which can be readily bent through an angle which is at most substantially less than 90 degrees but which holds its shape once it has been bent, so that height and orientation of the platform can be readily adjusted, the column having first and second rigid tubes, which are slideably engageable, so as to form a telescopic section, the first rigid tube being affixed to one end of the flexible tube, the second rigid tube defining an array of holes spaced apart longitudinally, a portion of the first rigid tube being disposed within the second rigid tube, the flexible tube when fully extended being disposed along an imaginary line which extends longitudinally through the first and second rigid tubes to points proximate with the center of gravity of the platform; and (d) adjustment means, including a pin connected to the first rigid tube, which protrudes to one side thereof and downwardly of its lower end, for engaging said holes one at a time.

2. The stand according to claim 1 which further comprises a horseshoe spring, distal ends of the spring being rigidly attached to the pin and to the lower end of the first rigid tube, the spring being disposed partially therewithin.

3. A computer stand for holding a laptop computer, comprising:

(a) a weighted base;

(b) a platform for holding the laptop computer, the platform being disposed in a generally horizontal position;

(c) a column having distal ends which are connected to the base and to the platform, respectively, the column having a flexible tube which can be readily bent but which holds its shape once it has been bent, so that height and orientation of the platform can be readily adjusted, the column having inner and outer rigid tubes, which are slideably engageable, so as to form a telescopic section, the inner rigid tube being affixed to one end of the flexible tube, the flexible tube when fully extended being disposed along an imaginary line which extends longitudinally through the inner and outer rigid tubes to points proximate with the center of gravity of the platform; and (d) adjustment means, including a retractable attachment connected to the lower end of the inner rigid tube, for incrementally adjusting the extension of the telescopic section, the outer rigid tube, at its upper end, having an inner diameter which is at least as great as it is in remaining portions of the outer rigid tube, the inner rigid tube having a generally uniform outer diameter which is slightly smaller than the inner diameter of the outer rigid tube.

* * * * *